(12) United States Patent
Shepal (10) Patent No.: US 11,699,431 B2
(45) Date of Patent: Jul. 11, 2023

(54) METHODS AND SYSTEMS FOR CODELESS CHATBOT DEVELOPMENT

(71) Applicant: Allstate Solutions Private Limited, Bangalore (IN)

(72) Inventor: Chinmayee Shepal, Maharashtra (IN)

(73) Assignee: Allstate Solutions Private Limited, Bangalore (IN)

( * ) Notice: Subject to any disclaimer, the term of this patent is extended or adjusted under 35 U.S.C. 154(b) by 113 days.

(21) Appl. No.: 17/469,241

(22) Filed: Sep. 8, 2021

(65) Prior Publication Data

US 2023/0076767 A1    Mar. 9, 2023

(51) Int. Cl.
| | |
|---|---|
| *G06F 8/34* | (2018.01) |
| *G10L 15/02* | (2006.01) |
| *G06F 8/36* | (2018.01) |
| *H04L 51/02* | (2022.01) |
| *G06F 40/40* | (2020.01) |

(Continued)

(52) U.S. Cl.
CPC ............... *G10L 15/02* (2013.01); *G06F 8/36* (2013.01); *G06F 40/40* (2020.01); *G06N 3/006* (2013.01); *G06N 3/08* (2013.01); *H04L 51/02* (2013.01)

(58) Field of Classification Search
CPC ......... H04L 51/02; G10L 15/02; G06N 3/006; G06N 3/08; G06F 8/36; G06F 40/40
See application file for complete search history.

(56) References Cited

U.S. PATENT DOCUMENTS

| | | |
|---|---|---|
| 2018/0075014 A1 | 3/2018 | Duan |
| 2019/0103111 A1 | 4/2019 | Tiwari et al. |

(Continued)

FOREIGN PATENT DOCUMENTS

| | | |
|---|---|---|
| JP | 2020532011 A | 11/2020 |
| KR | 102148439 B1 | 8/2020 |

(Continued)

OTHER PUBLICATIONS

Strutynskyi Maksym, "A concept of intent-based contextual chatbotwith capabilities for continual learning", Spring 2020, Master's Degree Project: 68 pgs <intentBased_Learning.pdf>.*

(Continued)

*Primary Examiner* — Tuan A Vu
(74) *Attorney, Agent, or Firm* — Dinsmore & Shohl LLP (57) ABSTRACT

Embodiments include implementing an iterative process to automatically develop a chatbot conversation for a conversation designer by receiving a conversation design input of one or more conversation design inputs from the conversation designer, identifying an intent based on the conversation design input, generating a development event based on the intent, retrieving a conversation chat flow from a set of conversation chat flows of a code sheet based on the development event, the code sheet comprising a set of conversations, the set of conversation chat flows, and a set of rules for code retrieval based on the set of conversations and the set of conversation chat flows, retrieving a chatbot computer program code based on the conversation chat flow and the set of rules from the code sheet, and repeating the iterative process until the chatbot computer program code is automatically retrieved from a code repository for each conversation design input.

20 Claims, 5 Drawing Sheets

(51) Int. Cl.
  *G06N 3/08*   (2023.01)
  *G06N 3/006*  (2023.01)

(56) References Cited

U.S. PATENT DOCUMENTS

| | | | |
|---|---|---|---|
| 2019/0124020 A1* | 4/2019 | Bobbarjung | H04L 51/02 |
| 2019/0158433 A1* | 5/2019 | Yun | G10L 15/02 |
| 2020/0034681 A1 | 1/2020 | Carver | |
| 2020/0143115 A1* | 5/2020 | Brigham | G06N 3/006 |
| 2020/0159991 A1 | 5/2020 | Chittari et al. | |
| 2020/0341970 A1* | 10/2020 | Rodrigues | H04L 51/02 |
| 2020/0387550 A1 | 12/2020 | Cappetta et al. | |
| 2021/0044546 A1 | 2/2021 | Xue et al. | |
| 2021/0150385 A1 | 5/2021 | Mallette | |

FOREIGN PATENT DOCUMENTS

| | | |
|---|---|---|
| WO | 2010078614 A1 | 7/2010 |
| WO | 2017041008 A1 | 3/2017 |

OTHER PUBLICATIONS

RPA + chatbots? Now you're talking'. UiPath. Feb. 17, 2021.
Smart chatbots for better business'. Ambit. Feb. 17, 2021.
International Search Report and Written Opinion for PCT Application No. PCT/US2022/042555, dated Dec. 9, 2023, 14 pages.

* cited by examiner

METHODS AND SYSTEMS FOR CODELESS CHATBOT DEVELOPMENT

TECHNICAL FIELD

The present disclosure relates to methods and systems for codeless chatbot development, particularly to methods and systems for codeless chatbot development that utilizes an artificial intelligence neural network model to automatically retrieve chatbot computer programming code based on a conversation design input from a conversation designer.

BACKGROUND

A chatbot is a software application that can automate conversations and interact with individuals through messaging platforms. A chatbot may be programmed to respond to an intent of the individual with whom the chatbot is interacting in a conversation such that the chatbot prompts the individual to provide information necessary to fulfill the intent.

Because chatbots may be associated with a particular intent and intent fulfillment, chatbots may engage in similar conversations with regard to their associated intent and intent fulfillment. Likewise, similarities in conversation style between chatbots may lead to redundant programming of chatbots. Moreover, developing chatbots with programming code may involve complex issues of software development and/or configuration. Therefore, a need exists for methods and systems for more efficient and streamlined chatbot development.

BRIEF SUMMARY

In accordance with one embodiment of the present disclosure, a system for intelligent codeless chatbot development includes a chatbot comprising an artificial intelligence neural network model and a natural language processing tool, one or more processors, one or more memory components communicatively coupled to the one or more processors and the chatbot, and machine-readable instructions stored in the one or more memory components. The machine-readable instructions may cause the one or more processors to implement an iterative process to automatically develop a chatbot conversation for a conversation designer by receiving, with the chatbot, a conversation design input of one or more conversation design inputs from the conversation designer, and identify, with the natural language processing tool, an intent based on the conversation design input. The machine-readable instructions may also cause the one or more processors to generate, with the artificial intelligence neural network model, a development event based on the intent, and retrieve a conversation chat flow from a set of conversation chat flows of a code sheet based on the development event, the code sheet comprising a set of conversations, the set of conversation chat flows, and a set of rules for code retrieval based on the set of conversations and the set of conversation chat flows. The machine-readable instructions may further cause the one or more processors to automatically retrieve a chatbot computer program code based on the conversation chat flow and the set of rules from the code sheet, and repeat the iterative process to develop the chatbot conversation until the chatbot computer program code is automatically retrieved from a code repository for each conversation design input of the one or more conversation design inputs from the conversation designer.

In accordance with another embodiment of the present disclosure, a system for intelligent codeless chatbot development includes a chatbot comprising an artificial intelligence neural network model and a natural language processing tool, one or more processors, one or more memory components communicatively coupled to the one or more processors and the chatbot, and machine-readable instructions stored in the one or more memory components. The machine-readable instructions may cause the one or more processors to implement an iterative process to automatically develop a chatbot conversation for a conversation designer by receiving, with the chatbot, a conversation design input of one or more conversation design inputs from the conversation designer, and identify, with the natural language processing tool, an intent based on the conversation design input. The machine-readable instructions may also cause the one or more processors to generate, with the artificial intelligence neural network model, a development event based on the intent, and retrieve a conversation chat flow from a set of conversation chat flows of a code sheet based on the development event, the code sheet comprising a set of conversations, the set of conversation chat flows, and a set of rules for code retrieval based on the set of conversations and the set of conversation chat flows, wherein each conversation chat flow is based on an associated intent, and wherein each conversation chat flow comprises a set of prompts for identification of information to generate a fulfillment of the associated intent. The machine-readable instructions may further cause the one or more processors to automatically retrieve a chatbot computer program code based on the conversation chat flow and the set of rules from the code sheet, and repeat the iterative process to develop the chatbot conversation until the chatbot computer program code is automatically retrieved from a code repository for each conversation design input of the one or more conversation design inputs from the conversation designer.

In accordance with yet another embodiment of the present disclosure, a method for intelligent codeless chatbot development includes implementing, via a processor, an iterative process to automatically develop a chatbot conversation for a conversation designer by receiving, with a chatbot comprising an artificial intelligence neural network model and a natural language processing tool, a conversation design input of one or more conversation design inputs from the conversation designer, and identifying, with the natural language processing tool, an intent based on the conversation design input. The method also includes generating, with the artificial intelligence neural network model, a development event based on the intent, and retrieving, via the processor, a conversation chat flow from a set of conversation chat flows of a code sheet based on the development event, the code sheet comprising a set of conversations, the set of conversation chat flows, and a set of rules for code retrieval based on the set of conversations and the set of conversation chat flows. The method further includes automatically retrieving, via the processor, a chatbot computer program code based on the conversation chat flow and the set of rules from the code sheet, and repeating the iterative process to develop the chatbot conversation until the chatbot computer program code is automatically retrieved from a code repository for each conversation design input of the one or more conversation design inputs from the conversation designer.

Although the concepts of the present disclosure are described herein with primary reference to chatbots, it is contemplated that the concepts will enjoy applicability to any software development platform or environment for a developed software application.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments of the present disclosure are directed to automatically retrieving computer programming code to develop chatbots, addressing redundant coding, and making the development of chatbots more accessible to conversation designers who are not fluent in developing computer program code. Methods and systems are described for a codeless chatbot development that utilizes an artificial intelligence (AI) neural network model to automatically retrieve computer program code for a chatbot.

Embodiments include a chatbot that may receive a conversation design input from a conversation designer as a person desiring to develop the chatbot even without providing code such as in a codeless manner such that computer programming code is automatically retrieved from a code repository based on a conversation design input and a code sheet as described in greater detail further below. Accordingly, disclosed herein are methods and systems for codeless chatbot development.

Figure 1:
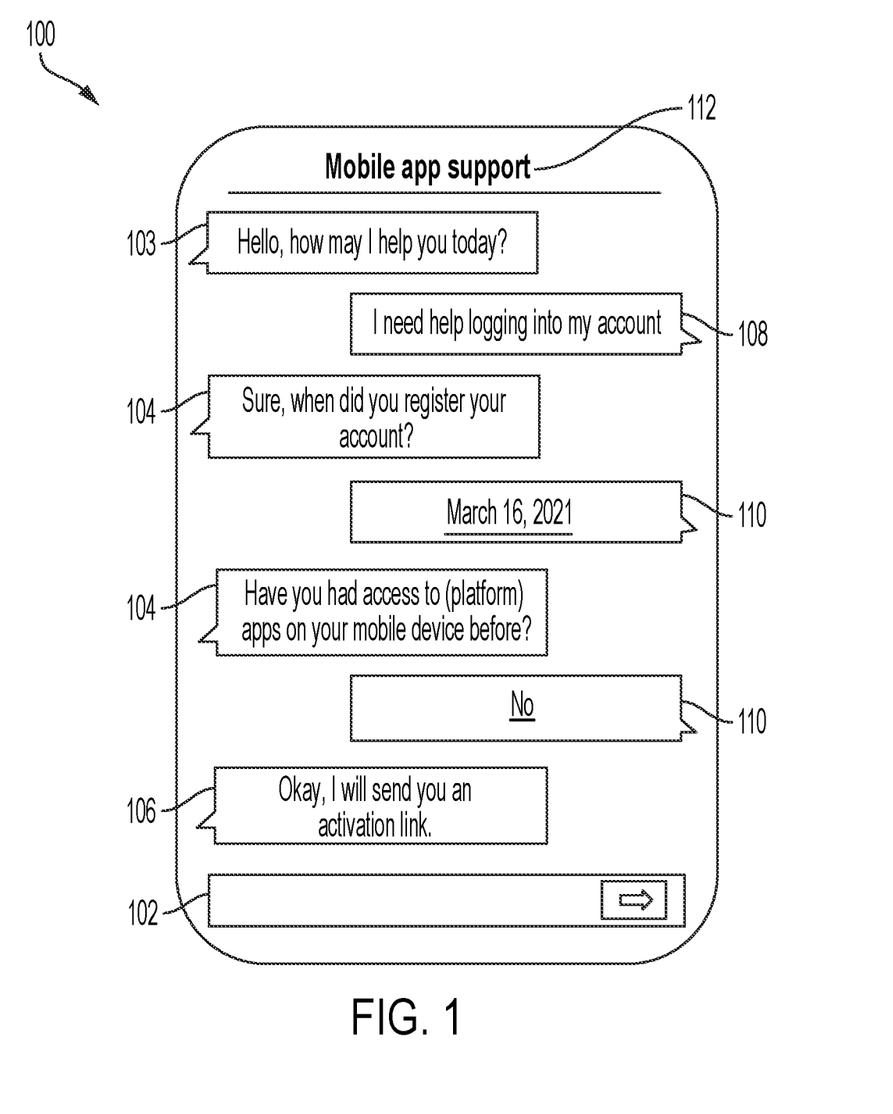
FIG. 1 depicts a graphical user interface of a chatbot showing a conversation with a user, according to one or more embodiments shown and described herein.

Referring now to FIG. 1, a chatbot 100 is depicted. The chatbot 100 may be an instantiation of computer program code as automatically retrieved from the code repository by embodiments of a development chatbot of the present disclosure. A graphical user interface is shown for the chatbot 100 including a conversation between the chatbot 100 and a user. The chatbot 100 may include an input text box 102 for the user to input information, a greeting 103 to start the conversation with the user, an utterance 108 as a message reply the user has input in response to the greeting, an intent 112, a prompt 104 for the user, a slot 110 as and for a user answer, and a fulfillment 106 as a response to fulfill the intent based on the user responses and the conversation. The chatbot may appear as a web application, a web browser plug-in, a standalone software application, or any other form of software. The chatbot may be a user-facing interface (i.e., the "front end") to a server (i.e., the "back end") that processes the user's request.

A conversation as shown in FIG. 1 is an exchange of information, or a "chat," between a user and a chatbot 100. The information exchanged may be text, speech, and/or other interactions and may be sent to the chatbot 100 via the input text box 102. The conversation may be initiated by the utterance 108 of the user. The utterance 108 may be a spoken or typed phrase that invokes an intent 112 (such as mobile app support as shown in FIG. 1). The intent 112 may be reflective of a particular goal that the user wants to achieve associated with and further defined by the utterance 108 of the user. The conversation may also be initiated by the greeting 103 to the user from the chatbot 100, with the expectation of an utterance 108 from the user as a response to the greeting 103 input via the input text box 102.

For example, a chatbot 100 may be developed to fulfill an intent 112 for mobile app support. The intent 112 for mobile app support may have been determined based on the utterance 108 input by the user in response to the chatbot greeting 103, the utterance 108 indicating that the user is having trouble logging into the user's account.

Based on the intent 112 invoked by the utterance 108, the chatbot 100 may have been previously programmed to follow a conversation chat flow to continue the conversation. Such conversation chat flows may be stored in a code sheet, such as in a spreadsheet or other documented format. The chatbot 100 may respond to the utterance 108 with a series of prompts 104 based on the conversation chat flow, each of which may be responded to by the user in the form of slots 110 as user answers to the prompts 104. A prompt 104 is representative of a question that asks the user to input data. A slot 110 is representative of data that the user provides as an answer and in response to a prompt 104 that may be used to fulfill the intent 112. The slot 110 may be an answer as a response entered by the user. A natural language processing (NLP) tool analyzes the user's response as the slot 110 to provide the chatbot 100 with information from the response. Once the prompts 104 are sufficiently answered, the chatbot 100 may generate a fulfillment 106. The fulfillment 106 may be representative of a message indicating an action is taking place along with a corresponding action based on business logic required to fulfill the intent 112 of the user in response to the conversation.

In the embodiment of FIG. 1, the chatbot 100 receives on the graphical user interface the user utterance 108, which invokes the intent 112 for mobile app support by the user. The chatbot 100 responds with the prompt 104 asking the user when the account was registered. The user responds by selecting a date as the slot 110 to provide the chatbot 100 with information to fulfill the intent 112. The chatbot 100 sends another prompt 104 asking the user whether the user has had access to applications before. In response, the user selects an answer in the negative as and for another slot 110 to provide the chatbot 100 with information to fulfill the intent 112. Because the chatbot 100 has received sufficient information to fulfill the intent, the chatbot 100 sends the user a fulfillment 106 to indicate to the user that the chatbot has taken action on the backend to send the user an activation link.

Figure 2:
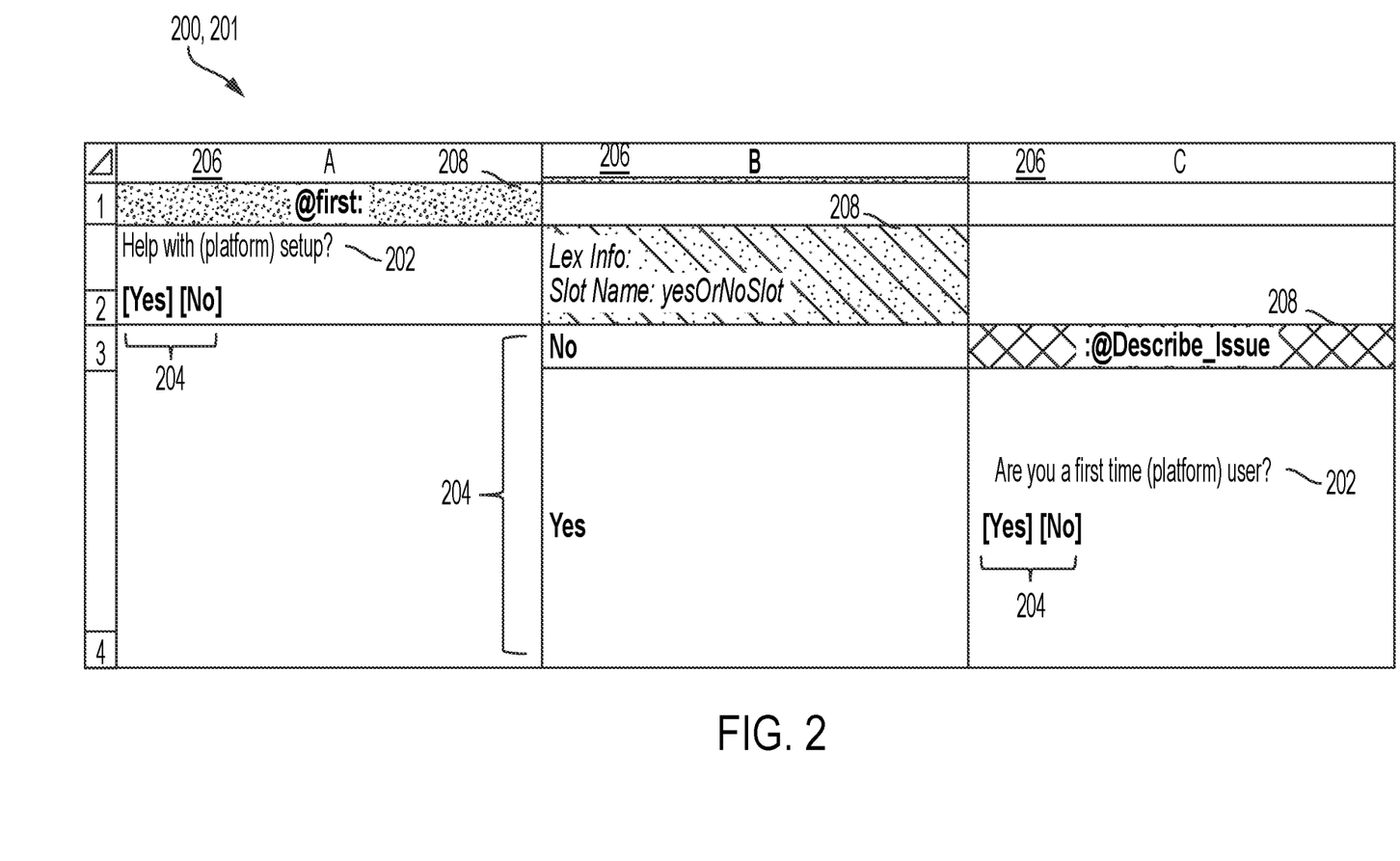
FIG. 2 depicts a code sheet with a conversation chat flow of a conversation, according to one or more embodiments shown and described herein.

Referring now to FIG. 2, automatically retrieving computer programming code for chatbots, such as the chatbot 100, may be based on a code sheet 200 that may include a set of conversations 201, a set of conversation chat flows 206, and a set of rules 208 for code retrieval and flow selection and sequencing. The code sheet 200 may be a spreadsheet, a database table, or any other tabular or data capture format.

The set of conversations 201 of the code sheet 200 may include conversations 201 that chatbots 100 have previously had. The set of conversations 201 may make up a set of historical conversation data that may be used to train an artificial intelligence (AI) neural network model such that the AI neural network model may output an appropriate prompt, fulfillment, or other conversational interaction when the AI neural network model receives, as input, responses from a user engaging in a conversation 201 with the chatbot 100. A conversation 201 may also be a combination of conversation chat flows 206 indicative of a conversation 201 that is likely to occur.

Each conversation chat flow 206 of the code sheet 200 may comprise one or more prompts 202. Each prompt 202 may be associated with one or more responses for a slot 204. The chatbot 100 may be associated with any number of conversation chat flows 206 such that the chatbot 100 may be responsive to a variety of intents 112. In the embodiment shown in FIG. 2, the code sheet 200 includes a conversation chat flow 206 as shown in Columns A, B, and C following a sequence of (A) listing an @First inquiry in Column A as a prompt 202, (B) listing a prompt with options for selection in Column B for a slot 204, and (C) responding in Column C with an @Describe_Issue response based on a positive selection of the slot 204. For the @First conversation inquiry in FIG. 2, a prompt 202 in Column A is shown of "Help with (platform) setup?" along with an option of "Yes" or "No" shown as a slot 204 selection. In Column B, in response, the slot 204 is displayed with a "Yes" response and a "No" response. The "No" response directs the chatbot 100 to follow a rule 208 to insert a @Describe Issue input request for the user to further describe the issue and intent 112. The "Yes" response invites the user to provide another utterance 108, which may lead to another conversation chat flow 206 and/or request to describe the issue.

The set of rules 208 of the code sheet 200 for code retrieval may include a set of computer program code corresponding to a set of conversation chat flows 206, and/or a set of computer program code corresponding to another chatbot 100. The set of rules 208 may be used to directly and/or switch between different conversation chat flows 206 based on, for instance, the selection of different options of slots 204 in response to prompts 202. The set of rules 208 may also prevent certain conversation chat flows 206 from being presented in response to different intents 112 and/or slots 204 selections.

Figure 3:
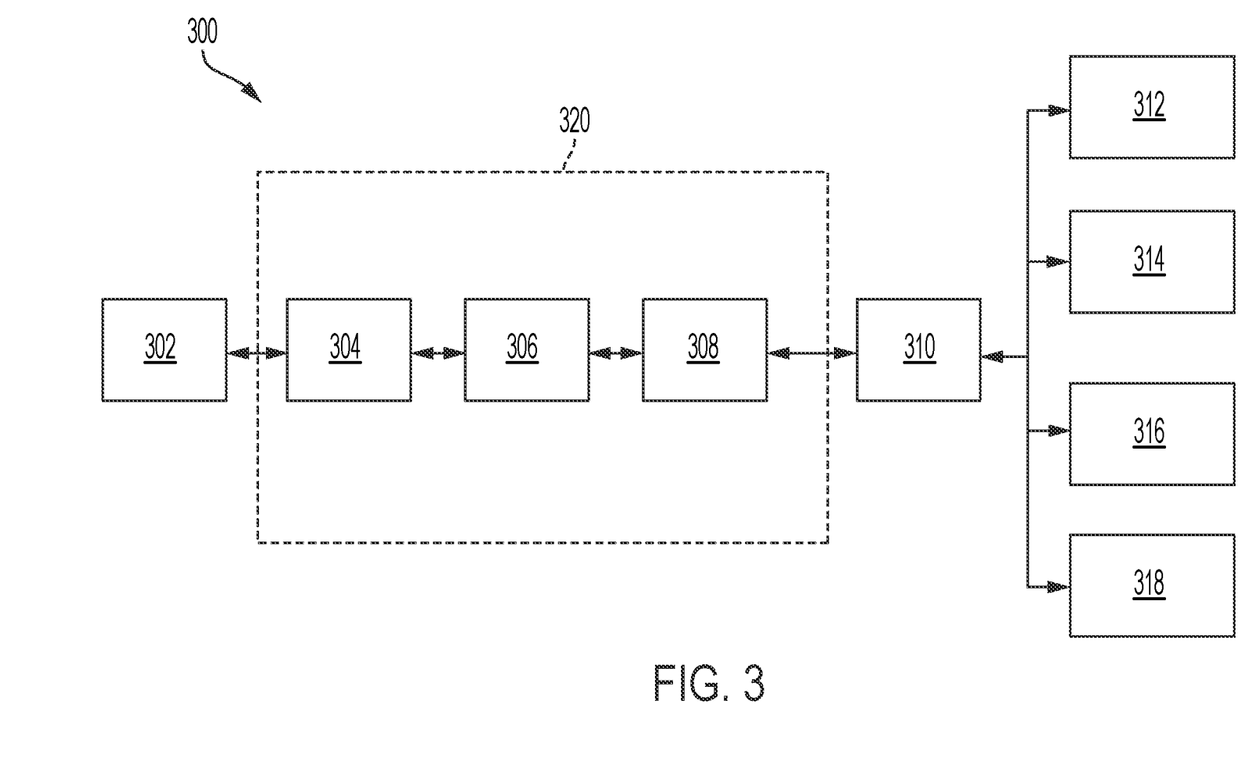
FIG. 3 schematically depicts a codeless chatbot development sub-system, according to one or more embodiments shown and described herein.

Referring now to FIG. 3, a sub-system 300 for codeless chatbot development is shown. The sub-system 300 may be a distributed system. The sub-system 300 may include a web portal 302, a chatbot platform 304, natural language processing (NLP) tools 306, an AI neural network model 308, a Pivotal Cloud Foundry (PCF) server 310, an access service 312, a code sheet repository 314, fulfillment services 316, and conversation chat flow services 318. While in FIG. 3, only one of each component comprising sub-system 300 is shown, it should be understood and is contemplated within the scope of this disclosure that any number of each component may be included. Further, each component may exist as separate devices, as depicted in FIG. 3, or as one or more devices comprising a combination of one or more of the components comprising sub-system 300. The sub-system 300 may be used to carry out the methods as described herein.

The sub-system 300 may be used by a conversation designer to automatically retrieve computer programming code for a chatbot 100 as described herein. The conversation designer may interact with the sub-system 300 via the web portal 302. The web portal 302 may be a web browser or any other software application presenting a graphical user interface (GUI) for conversation designer interaction. The web portal 302 serves as the front end of the system and may present the chatbot platform 304 as the GUI for the conversation designer to request the generation of computer programming code for the chatbot 100. The 100 may be presented to a conversation designer in a manner similar to the chatbot interface of the chatbot 100 presented in FIG. 1. The conversation designer may input text, receive prompts, and respond with slots to reach a fulfillment as an automated retrieval of computer program code for another chatbot 100.

The chatbot platform 304 maintains the interaction with the conversation designer for retrieving computer programming code for the chatbot 100. The chatbot platform 304 may host multiple instances of the chatbot 100 to service multiple automatic code retrieval requests simultaneously. The chatbot platform 304 may exist as a standalone application or may exist with the webserver that handles the maintenance of the web portal 302 traffic. The chatbot platform 304 may receive a conversation design input from a conversation designer, generate prompts, and receive responses in slots to collect information sufficient to retrieve computer program code for another chatbot. After fulfillment, the chatbot platform 304 may further generate one or more prompts 202 to the conversation designer to accept or reject each chatbot computer program code.

Interactions with a conversation designer on the chatbot platform 304 may require the use of NLP tools 306 for automatic speech recognition and natural language understanding. The NLP tools 306 may take natural language speech and text input and process the input to extract the underlying intent 112. For example, in interactions where the conversation designer types an utterance 108, the NLP tools 306 may be used to extract essential terms and/or filter irrelevant terms so that the chatbot platform 304 may form an appropriate intent 112. Additionally, as the conversation 201 develops, the NLP tools 306 may extract contexts from text inputs throughout the conversation 201 to invoke related intents. The NLP tools 306 may exist independently, as depicted in FIG. 3.

The sub-system 300 may also include the AI neural network model 308, which may be utilized in the automated retrieval of chatbot computer program code. The AI neural network model 308 may be trained on a set of historical conversation data and a set of historical fulfillment data corresponding to the set of historical conversation data. The historical conversation data and the historical fulfillment data may be based on one or more interactions with conversation designers and comprises past conversations that the conversation designers had with the chatbot 100 as well as previously retrieved chatbot code. The AI neural network model 308 improves the accuracy of the chatbot computer program code retrieval by applying machine learning to learn from best fit computer program code of existing chatbots, as well as from user feedback, such as acceptance or rejection by the conversation designer regarding previously retrieved chatbot computer program code. In embodiments, the AI neural network model 308 may apply such machine learning to generate computer program code should a match to desired code not be made to code in the code repository for retrieval.

An access service 312 may be used to manage access to the sub-system 300. The access service 312 may be a centralized database that manages conversation designer accounts and conversation designer sessions. When a conversation designer attempts to access the web portal 302 to request the sub-system 300 to retrieve chatbot computer programming code, the access service 312 may first authenticate the conversation designer and may also determine whether the conversation designer is authorized to request chatbot computer programming code. The access service 312 may remember the conversation designer's authentication and authorization for the duration of the conversation designer's session. The access service 312 may be based on an authentication and authorization protocol such as remote authentication dial-in user service (RADIUS), lightweight dictionary access protocol (LDAP), and similar protocols as understood to those of ordinary skill in the art. The access service 312 may exist as a standalone server or as a container on a server, as a virtual machine on a server, and other server types alongside other software.

The code sheet repository 314 may generally refer to a database associated with a computing device that may host one or more code sheets 200. The code sheet repository 314 may be a centralized location where the code sheets are stored, as well as the historical data for use by the AI neural network model 308.

Fulfillment services 316 may generally refer to one or more services that may be utilized to complete a fulfillment 106. With regards to the development of the chatbot 100, the sub-system 300 may use the fulfillment services 316 to manage the delivery of the automatically retrieved computer program code for the chatbot 100. The fulfillment services 316 may also be linked to the automatically retrieved computer program code for the new chatbot 100 or to modify the chatbot 100 to provide fulfillments 106 to users of the chatbot 100 and may include multiple components representing multiple different kinds of fulfillments 106, such as account management, application support, and other suitable types of fulfillment 106.

Conversation chat flow services 318 may generally refer to one or more services that contribute to the parsing, retrieval, and packaging of automatically retrieved computer programming code for the chatbot based on one or more conversation chat flows 206. The conversation chat flow services 318 may include a service to parse the code sheet into a computer-readable data structure for faster retrieval, analysis, and/or processing. The conversation chat flow services 318 may also cache the one or more conversation 201, the one or more conversation chat flows 206, and the one or more rules 208 in its code sheet 200 form or its parsed equivalent for more efficient retrieval in a subsequent development event.

Conversation chat flow services 318 may also be responsive to lambda events. A lambda event may include a lambda function and may be based on the development event. The lambda function may be representative of an anonymous function of code to contain functionality through the code as a computer programming subroutine or instructions, which functionality does not need to be named or tied to an identifier for the functionality. The lambda function may take in one or more arguments (e.g., functions as inputs) to return an expression as an anonymous function lambda such a lambda function that does not need to be named may be created from other input functions. Data from the lambda function may be sent to a function in JavaScript Object Notation (JSON), for example, as a lambda event. The lambda event may be a JSON-formatted document including data for the lambda function to process, and the lambda event may be converted to an object and passed to a function code. The lambda event may direct the conversation chat flow services 318 to retrieve one or more conversations 201, one or more conversation chat flows 206, and one or more rules 208 for code retrieval from the cache, parsed code sheets, and/or the code sheets 200. To facilitate the transfer of the retrieved data between services, servers, and/or cloud environments, the conversation chat flow services 318 may package the retrieved data by converting the retrieved data into a data interchange format such as JSON. The converted data may be transferred to the destination service, server, and/or cloud environment such as the cloud platform 320 where it may then be used to automatically retrieve the chatbot computer program code according to the development event.

One or more of the foregoing components comprising sub-system 300 may be incorporated in the cloud platform 320 hosted externally from the sub-system 300. For example, in FIG. 3, the chatbot platform 304, NLP tools 306, and AI neural network model 308 are hosted in the cloud platform 320.

For sub-systems 300 that utilize the cloud platform 320, the PCF server 310 may be used. The PCF server 310 may be a cloud abstraction framework that wraps around cloud platform offerings to allow self-managed infrastructure to interface with the cloud platform 320 through a centralized location. In FIG. 3, the chatbot platform 304, the NLP tools 306, and the AI neural network model 308 are hosted in a cloud platform 320, and the PCF server 310 may be utilized such that the access service 312, code sheet repository 314, fulfillment services 316, and conversation chat flow services 318 may interface with the cloud platform 320.

Figure 4:
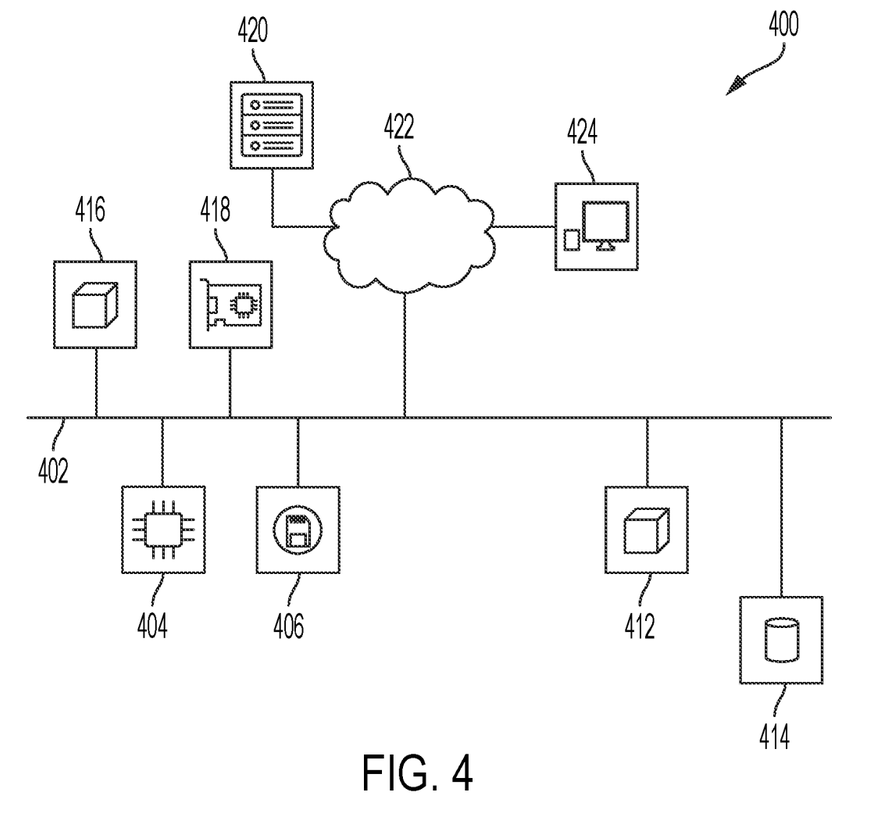
FIG. 4 schematically depicts a computer-implemented system for use with the processes described herein and the codeless chatbot development sub-system of FIG. 3, according to one or more embodiments shown and described herein.

Referring now to FIG. 4, a system 400 for codeless chatbot development may interface with the sub-system 300 to implement the processes as described herein. The system 400 may include a communication path 402, a processor 404, a memory component 406, a data storage component 414, a code sheet module 412, an AI neural network module 416, a network connectivity component 418, a server 420, a network 422, and a computing device 424. The network connectivity component 418 may communicatively connect the system 400 to server 420 and one or more computing devices 424 via the communication path 402 and the network 422. The system 400 may be communicatively coupled to the sub-system 300 of FIG. 3 via the network 422 (such as through the cloud platform 320) and may be used to carry out the methods and processes as described herein. The code sheet repository 314 of FIG. 3 may be a data storage component 414 and may be communicatively coupled to and operable by the code sheet module 412, and the AI neural network model 308 of FIG. 3 may be communicatively coupled to and operable by the AI neural network module 416.

The communication path 402 of the system 400 may be formed from any medium that is capable of transmitting a signal such as, for example, conductive wires, conductive traces, optical waveguides, and the like, or from a combination of mediums capable of transmitting signals. The communication path 402 communicatively couples the various components of system 400. As used herein, the term "communicatively coupled" means that coupled components are capable of exchanging data signals with one another such as, for example, electrical signals via a conductive medium, electromagnetic signals via air, optical signals via optical waveguides, and the like.

The processor 404 can be any device capable of executing machine-readable instructions. Accordingly, the processor 404 may be a controller, an integrated circuit, a microchip, a computer, or any other computing device. The processor 404 is communicatively coupled to the other components of the system 400 by the communication path 402. Accordingly, the communication path 402 may communicatively couple any number of processors with one another, and allow the modules coupled to the communication path 402 to operate in a distributed computing environment. Specifically, each of the components can operate as a node that may send and/or receive data.

The memory component 406 may be a non-transitory computer readable medium or non-transitory computer readable memory and may be configured as a non-volatile computer readable medium. The memory component 406 is communicatively coupled to the other components of the system 400 by the communication path 402. The memory component 406 may comprise RAM, ROM, flash memories, hard drives, or any other device capable of storing machine-readable instructions such that the machine-readable instructions can be accessed and executed by the processor 404. The machine-readable instructions may comprise logic or algorithms written in any programming language such as, for example, machine language that may be directly executed by the processor, or assembly languages, object-oriented programming (OOP) languages, scripting languages, microcode, and the like, that may be compiled or assembled into machine-readable instructions and stored on the memory component 406. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The data storage component 414 is coupled to the communication path 402 and may contain one or more persistent storage devices such as solid state drives, hard disk drives, or any other device capable of persistent data storage. The data storage component 414 may store data used by various components of the system 400. The code sheet repository 314 of FIG. 3 may be one of the one or more data storage components 414. In addition, the data storage component 414 may store data downloaded from the server 420 and/or received from the computing device 424. It should be understood that the data storage component 414 may reside local to and/or remote from the system 400, and may be configured to store one or more pieces of data for access by the system 400 and/or other components. The data storage component 414 may include computer program code, automatically retrieved chatbot code, and other electronic data documents. Other data to perform the functionalities described herein may also be stored in the data storage component 414 (e.g., cached data, user session data, historical automated code recommendation data, etc.).

The code sheet module 412 is communicatively coupled via the communication path 402 to the processor 404 and components of system 400. The code sheet module 412 may be any hardware capable of storing data. The hardware may be included as part of the data storage component 414. The code sheet module 412 may be a centralized location where code sheets 200 may be stored, as well as the historical data for use by the AI neural network module 416. The code sheet module 412 may also comprise a historical record of conversations, conversation chat flows, and rules for code retrieval, which may be used to provide historical data to the AI neural network module 416. The code sheet module 412 may exist remotely from the system 400, or locally to or included in the system 400, as depicted in FIG. 4.

The AI neural network module 416 is communicatively coupled via the communication path 402 to the processor 404 and components of system 400. The AI neural network module 416 may train and provide machine learning capabilities to a neural network such as the AI neural network model 308 as described herein. By way of example, and not as a limitation, a convolutional neural network (CNN) may be utilized as the AI neural network model 308. The AI neural network module 416 may receive a set of historical conversation data and a set of historical fulfillment data, corresponding to the set of historical conversation data, for training. The AI neural network module 416 may receive an intent 112 from a conversation designer as input and generate a development event as output, which may be used to automatically retrieve computer program code for the chatbot 100.

Data stored and manipulated in the system 400 as described herein is utilized by the AI neural network module 416, which can leverage a cloud computing-based network configuration such as the cloud (e.g., the cloud platform 320 of FIG. 3 and/or network 422 of FIG. 4) to apply machine learning and artificial intelligence. This machine learning application may create models that can be applied by the system 400, to make it more efficient and intelligent in execution. As an example and not a limitation, the AI neural network module 416 may include artificial intelligence components selected from the group consisting of an artificial intelligence engine, Bayesian inference engine, and a decision-making engine, and may have an adaptive learning engine further comprising a deep neural network learning engine.

The communication path 402 communicatively couples the network connectivity component 418 to other components of the system 400. The network connectivity component 418 can be any device capable of transmitting and/or receiving data via a wireless network. Accordingly, the network connectivity component 418 can comprise a communication transceiver for sending and/or receiving data according to any wireless communication standard. For example, the network connectivity component 418 can comprise a chipset (e.g., antenna, processors, machine-readable instructions, etc.) to communicate over wired and/or wireless computer networks such as, for example, Wi-Fi, WiMAX, Bluetooth, IrDA, Ethernet, Z-Wave, ZigBee, and the like.

The network 422 may comprise any wired and/or wireless network such as, for example, wide area networks, metropolitan area networks, local area networks, satellite networks, and the like. Accordingly, the network 422 can be utilized as an access point by the computing device 424 to access one or more servers (e.g., server 420). The server 420 and any additional services generally comprise processors, memory, and chipset for delivering resources via the network 422. Resources can include providing, for example, processing, storage, software, and information from the server 420 to the system 400 via the network 422. Additionally, it is noted that the server 420 and any additional servers can share resources with one another over the network 422 such as, for example, via the wired portion of the network, the wireless portion of the network, or combinations thereof.

The computing device 424 include computers such as laptop computer, desktop computers, smartphones, tablets, and the like that have a network connectivity component for communicating with system 400 and/or server 420 via network 422. The web portal 302 may be accessed through the computing device 424. A conversation designer may use the computing device 424 to engage with the system 400 by providing the system 400 with a conversation design input to instruct the system 400 to automatically retrieve a computer program code for developing the chatbot 100.

Figure 5:
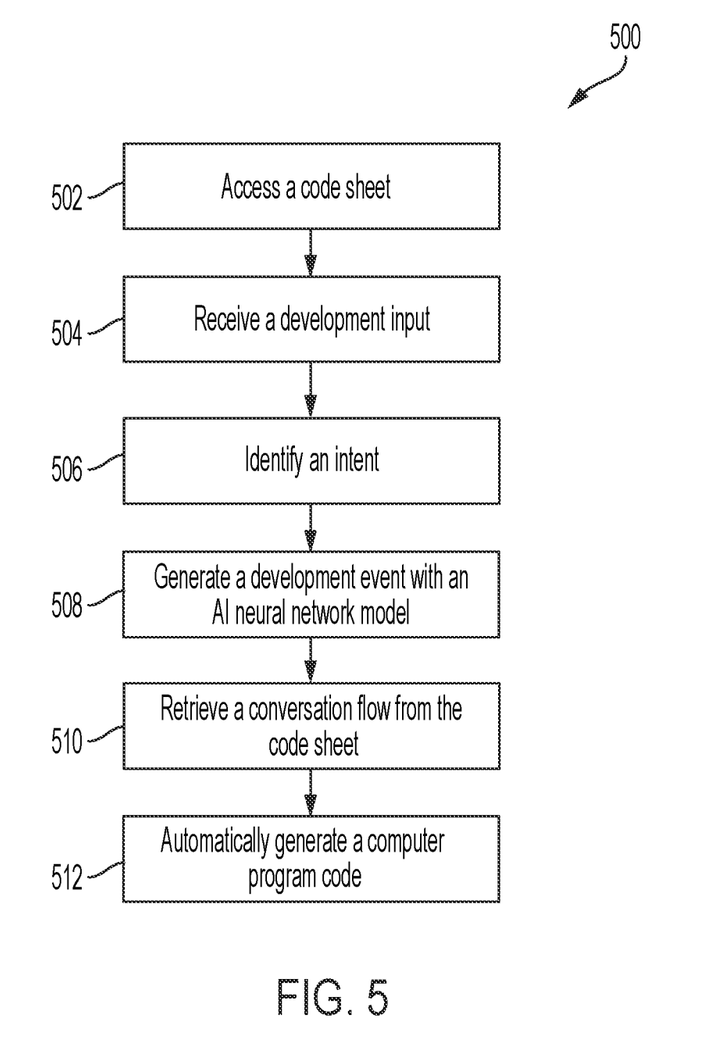
FIG. 5 depicts a process for use with the codeless chatbot development sub-system of FIG. 3 and the computer-implemented system of FIG. 4, according to one or more embodiments shown and described herein.

Referring now to FIG. 5, a process 500 for automatically retrieving chatbot computer programming code as described herein by use of the sub-system 300 and/or system 400 is set forth. In block 502, a code sheet 200 can be accessed to provide a set of conversations 201, a set of conversation chat flows 206, and a set of rules 208 for code retrieval based on the set of conversations 201 and the set of conversation chat flows 206. The code sheet 200 may thus provide components for automatically retrieving computer program code for a chatbot 100 in response to a conversation designer's request in block 504.

In block 504, an iterative process is implemented by first receiving a conversation design input from a conversation designer. The iterative process automatically retrieves a conversation 201 for a conversation designer by receiving a conversation design input of one or more conversation design inputs from the conversation designer.

For example, the conversation designer may or may not be familiar with computer programming. The conversation designer may retrieve computer programming code for a chatbot by entering one or more conversation design inputs via the sub-system 300. The conversation designer may enter an utterance 108 such as "I would like to develop an application support chatbot that determines an account registration date and a user's prior access to applications."

In block 506, an intent may be identified from the conversation design input received in block 504. In interactions where the conversation designer provides a conversation design input, the NLP tools 306 may be used to extract essential terms and/or filter irrelevant terms so that the chatbot may form an appropriate intent 112 that may include supporting parameters. For a determined new intent 112, a new conversation 201 may be input into the code sheet 200.

For example, the conversation designer may enter the utterance 108 such as "I would like to develop an application support chatbot that determines an account registration date and a user's prior access to applications." The NLP tools 306 may be used to extract essential terms, such as "develop an application support chatbot," "account registration date," and "user's prior access." The NLP tools 306 may also be used to filter irrelevant terms, such as "I would like to," "that," and "and." The NLP tools 306 may identify "develop an application support chatbot" as an intent 112 to develop a chatbot 100 for application support and "account registration date" and "user's prior access" as parameters for potential prompts 202.

In block 508, a development event is generated based on the identified intent. The AI neural network model 308 may generate a development event by taking the identified intent 112 as an input to compare against the historical conversation data and the historical fulfillment data that it was trained on. Because fulfillments require an intent and prompts to gather data necessary to fulfill the intent, the AI neural network model 308 can utilize the identified intent 112 to identify historical fulfillments based on similar intents, which in turn also identifies historical conversations associated with the historical fulfillments. The historical conversations may include one or more conversations flows 206 from the set of conversations flows 206. The development event may contain instructions to gather the conversation chat flows 206 utilized in each historical conversation associated with historical fulfillments having a similar intent as the identified intent 112. Which conversation chat flows 206 are gathered may also be impacted by the parameters identified by the NLP tool 306. The conversation designer may be prompted to provide more information to help narrow down the amount of conversation chat flows 206 that may be gathered.

In addition, the development event generated by AI neural network model 308 may include instructions to compress the gathered conversation chat flows 206 such that the gathered conversation chat flows 206 contain fewer prompts 104, 202 than in their state prior to retrieval. For example, if historical conversation data reveals that two conversations having the same intent 112 and arriving at the same fulfillment 106 despite each conversation 201 have additional prompts 104, 202 that the other does not have, the AI neural network model 308 may contain instructions to remove one or more conversations flows of the conversations having additional prompts 104, 202 that do not impact the fulfillment 106.

In block 510, a conversation chat flow 206 is retrieved from the set of conversation chat flows 206 based on the development event. Multiple conversation chat flows 206, as identified by the development event, may be combined to form a single conversation chat flow 206. The conversation chat flow 206 may be compressed according to the development event. The conversation chat flows 206 may be located in a code sheet 200, as described in the discussion of FIG. 2. The code sheet 200 may be located in a code sheet repository 314, as described in the discussion of FIG. 3. The retrieval of conversation chat flows 206 may be orchestrated by a conversation chat flow service 318, as described in the discussion of FIG. 3, to handle the parsing, caching, retrieval, and/or other forms of data processing.

In block 512, a chatbot computer program code may be automatically retrieved from the code repository based on the retrieved conversation chat flow 206. Similar to how the conversation chat flow 206 was created by combining multiple conversation chat flows 206 as directed by the development event, the rules for code retrieval associated with the conversation chat flows 206 identified by the development event may be combined to form a codebase sufficient to develop a chatbot 100 for the identified intent 112. The computer program code may be sent to the conversation designer as a fulfillment message in the chatbot 100. The computer program code may be sent to the conversation designer in whole or in part to approve or reject the entirety or components of the computer program code. If the computer program code is approved, the chatbot 100 may transfer the computer program code to the user as a source code file, a compiled binary, or any other form of computer program code. If the computer program code is rejected, the AI neural network model 308 may receive the feedback and generate a new development event such that different combinations or arrangements of conversation chat flows 206 are combined to form a new retrieved conversation chat flow 206.

The iterative process as implemented in blocks 504-512 may repeat to develop the chatbot conversation 201 until the chatbot computer program code is automatically retrieved in block 512 for each conversation design input of the one or more conversation design inputs from the conversation designer. It should now be understood that disclosed herein are embodiments directed to methods and systems for codeless chatbot development for a chatbot 100. Embodiments may access a code sheet 200, receive a conversation design input from a conversation designer, identify an intent 112 from the conversation design input, generate a development event with an AI component such as the AI neural network model 308, retrieve a conversation chat flow 206 from the code sheet 200 based on the development event, and automatically retrieve computer program code that may be used to create the chatbot 100.

The AI component of the system, such as the AI neural network model 308, may be trained on a set of historical conversation data and a set of historical fulfillment data corresponding to the set of historical conversation data. The AI component may receive a conversation design input and may automatically generate a development event as an output. The development event may be instructions to retrieve one or more conversation chat flows 206 from the code sheet 200, along with their associated rules 208 for code retrieval, that may be combined into a single conversation chat flow 206 from which computer program code may be automatically retrieved to fulfill the conversation designer's intent 112. The AI component may improve its future code retrievals based on the conversation designer's decisions to approve or reject prior chatbot code retrievals.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A system for intelligent codeless chatbot development, the system comprising:
   a chatbot comprising an artificial intelligence neural network model and a natural language processing tool;
   one or more processors;
   one or more memory components communicatively coupled to the one or more processors and the chatbot; and
   machine-readable instructions stored in the one or more memory components that cause the one or more processors to perform at least the following:
      implement an iterative process to automatically develop a chatbot conversation for a conversation designer by receiving, with the chatbot, a conversation design input of one or more conversation design inputs from the conversation designer;
      identify, with the natural language processing tool, an intent based on the conversation design input;
      generate, with the artificial intelligence neural network model, a development event based on the intent;
      retrieve a conversation chat flow from a set of conversation chat flows of a code sheet based on the development event, the code sheet comprising a set of conversations, the set of conversation chat flows, and a set of rules for code retrieval based on the set of conversations and the set of conversation chat flows;
      automatically retrieve a chatbot computer program code based on the conversation chat flow and the set of rules from the code sheet; and
      repeat the iterative process to develop the chatbot conversation until the chatbot computer program code is automatically retrieved from a code repository for each conversation design input of the one or more conversation design inputs from the conversation designer.

2. The system of claim 1, wherein the artificial intelligence neural network model is trained on a set of historical conversation data and a set of historical fulfillment data corresponding to the set of historical conversation data.

3. The system of claim 1, wherein the machine-readable instructions further cause the one or more processors to:
   generate one or more prompts to the conversation designer by the chatbot to accept or reject each chatbot computer program code retrieved based on the conversation chat flow and the set of rules from the code sheet.

4. The system of claim 3, wherein the machine-readable instructions further cause the one or more processors to:
   train the artificial intelligence neural network model using machine learning based on the chatbot computer program code, acceptance or rejection of each chatbot computer program code, or combinations thereof.

5. The system of claim 1, wherein each conversation chat flow is based on an associated intent, and wherein each conversation chat flow comprises a set of prompts for identification of information to generate a fulfillment of the associated intent.

6. The system of claim 5, wherein the machine-readable instructions further cause the one or more processors to:
   compress, with the artificial intelligence neural network model, the conversation chat flow retrieved from the set of conversation chat flows such that the conversation chat flow contains fewer prompts than prior to retrieval.

7. The system of claim 1, wherein to retrieve the code sheet, the machine-readable instructions further cause the one or more processors to:
   parse the code sheet into a computer program code format.

8. The system of claim 1, wherein the machine-readable instructions further cause the one or more processors to:
   generate a lambda event based on the development event;
   select a conversation from the set of conversations, the conversation chat flow, and one or more rules from the set of rules from the code sheet for code retrieval based on the lambda event;

convert the conversation, the conversation chat flow, and the one or more rules into a data interchange format;

transmit the conversation, the conversation chat flow, and the one or more rules to a cloud platform based on the lambda event; and automatically retrieve the chatbot computer program code based on the data interchange format from the cloud platform.

9. The system of claim 8, wherein the machine-readable instructions further cause the one or more processors to:

cache the conversation, the conversation chat flow, and the one or more rules for a subsequent development event.

10. A system for intelligent codeless chatbot development, the system comprising:

a chatbot comprising an artificial intelligence neural network model and a natural language processing tool;

one or more processors;

one or more memory components communicatively coupled to the one or more processors and the chatbot; and machine-readable instructions stored in the one or more memory components that cause the one or more processors to perform at least the following:

implement an iterative process to automatically develop a chatbot conversation for a conversation designer by receiving, with the chatbot, a conversation design input of one or more conversation design inputs from the conversation designer;

identify, with the natural language processing tool, an intent based on the conversation design input;

generate, with the artificial intelligence neural network model, a development event based on the intent;

retrieve a conversation chat flow from a set of conversation chat flows of a code sheet based on the development event, the code sheet comprising a set of conversations, the set of conversation chat flows, and a set of rules for code retrieval based on the set of conversations and the set of conversation chat flows, wherein each conversation chat flow is based on an associated intent, and wherein each conversation chat flow comprises a set of prompts for identification of information to generate a fulfillment of the associated intent;

automatically retrieve a chatbot computer program code based on the conversation chat flow and the set of rules from the code sheet; and repeat the iterative process to develop the chatbot conversation until the chatbot computer program code is automatically retrieved from a code repository for each conversation design input of the one or more conversation design inputs from the conversation designer.

11. The system of claim 10, wherein the artificial intelligence neural network model is trained on a set of historical conversation data and a set of historical fulfillment data corresponding to the set of historical conversation data.

12. The system of claim 10, wherein the machine-readable instructions further cause the one or more processors to:

generate one or more prompts to the conversation designer by the chatbot to accept or reject each chatbot computer program code retrieved based on the conversation chat flow and the set of rules from the code sheet.

13. The system of claim 12, wherein the machine-readable instructions further cause the one or more processors to:

train the artificial intelligence neural network model using machine learning based on the chatbot computer program code, acceptance or rejection of each chatbot computer program code, or combinations thereof.

14. The system of claim 10, wherein the machine-readable instructions further cause the one or more processors to:

compress, with the artificial intelligence neural network model, the conversation chat flow retrieved from the set of conversation chat flows such that the conversation chat flow contains fewer prompts than prior to retrieval.

15. A method for intelligent codeless chatbot development, the method comprising:

implementing, via a processor, an iterative process to automatically develop a chatbot conversation for a conversation designer by receiving, with a chatbot comprising an artificial intelligence neural network model and a natural language processing tool, a conversation design input of one or more conversation design inputs from the conversation designer;

identifying, with the natural language processing tool, an intent based on the conversation design input;

generating, with the artificial intelligence neural network model, a development event based on the intent;

retrieving, via the processor, a conversation chat flow from a set of conversation chat flows of a code sheet based on the development event, the code sheet comprising a set of conversations, the set of conversation chat flows, and a set of rules for code retrieval based on the set of conversations and the set of conversation chat flows;

automatically retrieving, via the processor, a chatbot computer program code based on the conversation chat flow and the set of rules from the code sheet; and repeating the iterative process to develop the chatbot conversation until the chatbot computer program code is automatically retrieved from a code repository for each conversation design input of the one or more conversation design inputs from the conversation designer.

16. The method of claim 15, wherein the artificial intelligence neural network model is trained on a set of historical conversation data and a set of historical fulfillment data corresponding to the set of historical conversation data.

17. The method of claim 15, further comprising:

generating one or more prompts to the conversation designer by the chatbot to accept or reject each chatbot computer program code retrieved based on the conversation chat flow and the set of rules from the code sheet.

18. The method of claim 17, further comprising:

training the artificial intelligence neural network model using machine learning based on the chatbot computer program code, acceptance or rejection of each chatbot computer program code, or combinations thereof.

19. The method of claim 15, further comprising:

compressing, with the artificial intelligence neural network model, the conversation chat flow retrieved from the set of conversation chat flows such that the conversation chat flow contains fewer prompts than prior to retrieval.

20. The method of claim 15, further comprising:

generating a lambda event based on the development event;

selecting a conversation from the set of conversations, the conversation chat flow, and one or more rules from the set of rules from the code sheet for code retrieval based on the lambda event;

converting the conversation, the conversation chat flow, and the one or more rules into a data interchange format;

transmitting the conversation, the conversation chat flow, and the one or more rules to a cloud platform based on the lambda event; and automatically generating the chatbot computer program code based on the data interchange format from the cloud platform.

\* \* \* \* \*